US011663406B2

(12) United States Patent
Bali

(10) Patent No.: US 11,663,406 B2
(45) Date of Patent: May 30, 2023

(54) METHODS AND SYSTEMS FOR AUTOMATED DETECTION OF PERSONAL INFORMATION USING NEURAL NETWORKS

(71) Applicant: NetApp, Inc., Sunnyvale, CA (US)

(72) Inventor: Adam Bali, Tel-Aviv (IL)

(73) Assignee: NETAPP, INC., San Jose, CA (US)

( * ) Notice: Subject to any disclaimer, the term of this patent is extended or adjusted under 35 U.S.C. 154(b) by 114 days.

(21) Appl. No.: 16/945,525

(22) Filed: Jul. 31, 2020

(65) Prior Publication Data
US 2022/0036003 A1 Feb. 3, 2022

(51) Int. Cl.
*G06F 40/284* (2020.01)
*G06F 40/205* (2020.01)
*G06F 40/253* (2020.01)

(52) U.S. Cl.
CPC .......... *G06F 40/284* (2020.01); *G06F 40/205* (2020.01); *G06F 40/253* (2020.01)

(58) Field of Classification Search
CPC .... G06F 40/205; G06F 40/253; G06F 40/284; G06F 40/295
See application file for complete search history.

(56) References Cited

U.S. PATENT DOCUMENTS

| | | | | |
|---|---|---|---|---|
| 10,169,315 | B1* | 1/2019 | Heckel | G06N 3/0481 |
| 2018/0365560 | A1* | 12/2018 | Qiao | G06F 40/295 |
| 2020/0250139 | A1* | 8/2020 | Muffat | G06K 9/6264 |
| 2021/0064781 | A1* | 3/2021 | Raphael | G06V 10/757 |
| 2021/0125615 | A1* | 4/2021 | Medalion | G10L 15/1815 |

OTHER PUBLICATIONS

Du, Cunxiao, et al. "Explicit interaction model towards text classification." Proceedings of the AAAI Conference on Artificial Intelligence. vol. 33. No. 01. 2019. (Year: 2019).*
Dos Santos, Cicero, and Bianca Zadrozny. "Learning character-level representations for part-of-speech tagging." International Conference on Machine Learning. PMLR, 2014. (Year: 2014).*

* cited by examiner

*Primary Examiner* — Paras D Shah
(74) *Attorney, Agent, or Firm* — Haynes and Boone, LLP

(57) ABSTRACT

A method, a computing device, and a non-transitory machine-readable medium for detecting personal information. Terms that are of interest are extracted from a corpus of raw text that has been extracted from a collection of documents. For each of the terms, a surrounding sentence is extracted to form a target sentence to thereby form a plurality of target sentences. The surrounding sentence includes at least one reference to a data subject. A matrix of feature information is generated for each of the target sentences to form a plurality of matrices. A neural network model is trained, using the matrices as input, to compute an output that indicates a likelihood of a given sentence containing personal information.

20 Claims, 8 Drawing Sheets

METHODS AND SYSTEMS FOR AUTOMATED DETECTION OF PERSONAL INFORMATION USING NEURAL NETWORKS

TECHNICAL FIELD

The present description relates to the detection of information, and more specifically, to methods and systems for the automated detection of personal information in relevant context using sequence-based neural networks.

BACKGROUND

Different types of companies are becoming increasingly concerned with data protection specifically with regards to personal information or data. For example, due to recent data privacy regulations (e.g., the Global Data Protection Regulation (GDPR), the California Consumer Privacy Act (CCPA), etc.), companies are in need of ways to map, manage, and secure personal information found in electronic documents (e.g., digital files). But identifying personal information in a company's large collection of documents may be more difficult than desired. Personal information may exist not only in structured tables and databases but also in free text and unstructured documents. Personal information may include information relating to religious views, political views, financial information, medical information, ethnicity, race, or a combination thereof. Some currently available methods for detecting personal information include searching (e.g., querying) for words or phrases that have been previously identified as relating to personal information. As one example, with respect to personal information relating to religious views, searches may be performed for words identifying religious affiliations (e.g., "Catholic," "Jewish," "Muslim," "Hindu," "Atheist," etc.). However, this type of methodology may be vulnerable to a high rate of false positives. For example, many sentences containing these words do not necessarily contain any personal information. Thus, it may be desirable to provide methods, systems, and machine-readable media that take into account at least some of the issues described above.

BRIEF DESCRIPTION OF THE DRAWINGS

The present disclosure is best understood from the following detailed description when read with the accompanying figures.

DETAILED DESCRIPTION

Figure 1:
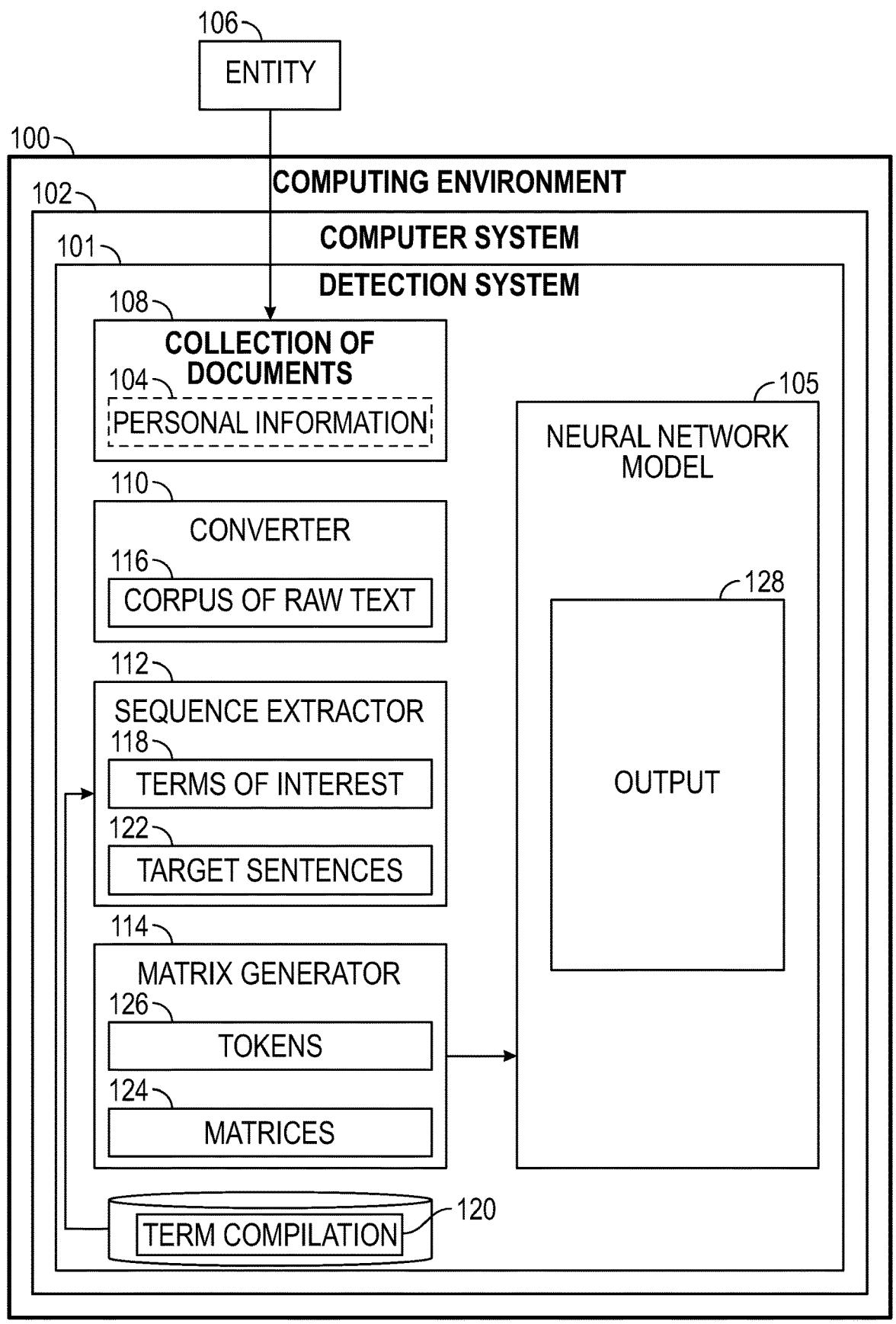
FIG. 1 is a block diagram illustrating a computing environment 100 in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The various embodiments described herein provide methods, systems, and machine-readable media for efficiently and accurately detecting personal information in documents. Personal information may include, for example, but is not limited to, information that identifies religious views, political views, medial history, ethnicity, race, sexual preferences (e.g., sexual orientation), etc. The methods, systems, and machine-readable media described herein enable detecting personal information with a detailed level of granularity, e.g., at the level of individual sentences in the document, and a high rate of accuracy.

In one or more examples, a detection system uses a collection of documents to train a neural network model that will be used for the detection of personal information. This training is performed using by extracting raw text from the collection of documents to yield a corpus of raw text for processing. The corpus of raw text is analyzed to detect terms. As used herein, a term may be a word or phrase that has been previously identified as relating to personal information. In this manner, a term is a word or phrase of interest. For each term of interest that is detected, a surrounding sentence is identified. The surrounding sentence is extracted to become a target sentence if that surrounding sentence contains at least one reference to a data subject. A reference to a data subject may be, for example, a name of a person, a pronoun, a direct reference to a person or type of person, or some other type of reference. The detection system generates a matrix of feature information for each target sentence that is extracted. The matrix of feature information includes, for example, a sequence of vectors, with each vector corresponding to a different token of the sentence. Each vector for a token includes information for a plurality of selected features with respect to that token. A token may be a word or special character in the sentence. These matrices are then fed into a sequence-based neural network model to train the sequence-based neural network model. Specifically, the neural network model is trained to compute, for a given sentence, an output that indicates a likelihood of that given sentence containing personal information. The matrix of feature information for a sentence provides the context for each token of a sentence so that the context surrounding the term of interest in that sentence can be internalized by the neural network model.

Once trained, the neural network model may be fed the matrix of feature information for any sentence in a document and will output a probability indicator of the likelihood that the sentence contains personal information with a high level of accuracy. This probability indicator may then be used to classify that sentence as a personal sentence (e.g., containing personal information) or a nonpersonal sentence (not containing personal information). Thus, the embodiments provide a way of detecting personal information practically and efficiently, while taking into account relevant context. Further, the embodiments described herein may improve the functioning of a computer system with respect to the accuracy of the processing of documents and the detection of personal information within those documents. For example, the false positives rate (FPR) may be reduced with the embodiments described herein as compared to some currently available methods for detecting personal information.

The training and use of a neural network model, as described herein, for the purposes of detecting personal information in a manner that takes into account the relevant context may enable business entities to ultimately reduce costs associated with data loss protection. Once documents containing personal information can be identified with accuracy, those documents may be protected. Reducing the false positive rate means reducing the overall number of documents that need to be protected (e.g., with specialized encryption or data protection measures), thereby reducing overall costs and processing resources.

Referring now to the figures, FIG. 1 is a block diagram illustrating a computing environment 100 in accordance with one or more example embodiments. The computing environment 100 includes a detection system 101. The detection system 101 may be implemented using hardware, software, firmware, or a combination thereof. In one or more examples, the detection system 101 is implemented within a computer system 102. The computer system 102 may include a processor, a single computer, or multiple computers in communication with each other. In some examples, the computer system 102 is or is integrated as part of a cloud computing platform. For example, the detection system 101 may be implemented as a service that is provided by or otherwise associated with a cloud computing platform. In some examples, the detection system 101 includes non-transitory computer-readable media that may be read using the computer system 102 or the machine executable code stored on such non-transitory computer-readable media.

The detection system 101 is used to detect personal information (or personal data) 104. Personal information 104 includes, for example, but is not limited to, information about a person's religious views, political views, ethnicity, race, philosophical believes, medical background, criminal background, sexual preferences, or a combination thereof. In one or more examples, the personal information 104 being detected is determined by one or more data privacy regulations (e.g., the GDPR, the CCPA, etc.).

The detection system 101 uses a neural network model 105 to identify the personal information 104. The neural network model 105 may include any number of neural networks. As used herein, a "neural network" (NN) or an "artificial neural network" refers to mathematical algorithms or computational models that mimic an interconnected group of artificial neurons that processes information based on a connectionistic approach to computation. Neural networks can employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A neural network processes information in two ways; when it is being trained it is in learning mode and when it puts what it has learned into practice it is in inference (or prediction) mode. Neural networks learn through a feedback process (e.g., backpropagation) which allows the network to adjust the weight factors (modifying its behavior) of the individual nodes in the intermediate hidden layers so that the output matches the outputs of the training data. In other words, it learns by being fed training data (learning examples) and eventually learns how to reach the correct output, even when it is presented with a new range or set of inputs. Examples of the types of neural networks, include, but are not limited to: Feedforward Neural Network (FNN), Recurrent Neural Network (RNN), Modular Neural Network (MNN), Convolutional Neural Network (CNN), Residual Neural Network (ResNet), etc. In these examples, the neural network model 105 includes any number of artificial neural networks, any number of learning algorithms, any number of modeling techniques, or a combination thereof to detect personal information 104. In one or more examples, the neural network model 105 includes an RNN.

In one or more examples, the neural network model 105 is customized or tailored for use by entity 106. The entity 106 may be, for example, a business organization, a governmental organization, an education organization, a non-profit organization, a financial institution, a legal firm, an international organization, a media company, a person, a group of persons, an enterprise, or some other type of entity. In some cases, the entity 106 manages the detection system 101. In other examples, the detection system 101 is a third-party service provided to the entity 106 via a cloud computing platform. For example, the detection system 101 may be run on one or more cloud servers.

In one or more examples, customizing the neural network model 105 for use by the entity 106 includes ensuring that the neural network model 105 is capable of accurately detecting personal information 104 given any document with relevant context. The detection system 105 trains the neural network model 105 using a collection of documents 108.

In addition to the neural network model 105, the detection system 105 includes a converter 110, a sentence extractor 112, and a feature manager 114 that together generate the training inputs for the neural network model 105. Each of the converter 110, the sentence extractor 112, and the feature manager 114 may be implemented using hardware, software, firmware, or a combination thereof. In one or more examples, the feature manager 114 may be considered part of or integrated as part of the neural network model 105.

The converter 110 converts the collection of documents 108 into a corpus of raw text 116. The collection documents 108 is a collection of electronic documents (e.g., a collection of digital files). As used herein, a document may take different forms including, but not limited to, a PDF, a word processing document, a spreadsheet, a presentation document (e.g., a PowerPoint file), an image, etc. In one or more examples, the converter 110 extracts raw text from each document in the collection of documents 108 to generate the corpus of raw text 116.

The sentence extractor 112 is used to extract sentences from the corpus of raw text 116 that potentially contain personal information 104. In one or more examples, the sentence extractor 112 detects terms of interest (or "terms") 118 in the corpus of raw text 116. In these examples, a term is a word. In other examples, however, a term may be a word or a phrase (i.e., two or more words combined together). The terms of interest 118 include any term in a given sentence of the corpus of raw text 116 that is matched to a term compilation 120. The term compilation 120 may take a number of different forms. For example, the term compilation 120 may be a dictionary of terms, a database of terms, a list of terms, a spreadsheet of terms, some other type of compilation, or a combination thereof. The term compilation 120 may include, for example, terms that are known or preselected as being related to personal information 104. For example, the term compilation 120 may include terms that are known or preselected as being related to a personal information category identified in Article 9 of the GDPR. For example, without limitation, the term compilation 120 may include terms previously identified as being related to any one or more of race, ethnic origin, political opinions, religious or philosophical beliefs, trade union membership, genetic data, biometric data, medical or health data, data concerning a person's sexual life or sexual orientation.

The sentence extractor 112 identifies a plurality of target sentences 122 based on the terms of interest 118 identified. Each of these target sentences 122 is one that includes at least one term that is of interest and at least one reference to a data subject. A data subject is a "person." For example, a reference to a data subject may be a name of a person (e.g., first name, last name, both), a pronoun (e.g., "he," "she," etc.), a direct reference to a person or type of person (e.g., "the customer," "the man," "the employee," etc.).

The feature manager 114 generates a plurality of matrices 124 for the target sentences 122. In particular, the feature manager 114 generates a corresponding matrix for each of the target sentences 122. For example, in one or more examples, the feature manager 114 first forms a plurality of tokens 126 for each of the target sentences 122. The tokens 126 for a particular target sentence may include, for example, each word and each special character in that particular target sentence. In other examples, the tokens 126 may include each word and one or more special characters in that particular target sentence (e.g., while certain special characters may be considered tokens, others may not). In still other examples, the tokens 126 may only include words from the target sentence. For each of the tokens 126, the feature manager 114 generates a corresponding vector of features, with each feature for a corresponding token providing a representation of or information about that token. In some examples, each of the tokens 126 is represented by a single vector in the corresponding matrix of the matrices 124. In some cases, the single vector is of fixed size.

The neural network model 105 is trained to detect the personal information 104 using the matrices 124 as training inputs. The neural network model 105 is trained, using the matrices 124, to compute an output 128 that indicates a likelihood of a given sentence containing the personal information 104. In one or more examples, the output 128 is a probability indicator having a value between 0 and 1 that indicates the likelihood that the given sentence contains the personal information 104.

A more detailed description of how the neural network model 105 is trained is described in FIGS. 2 and 3 below.

Figure 2:
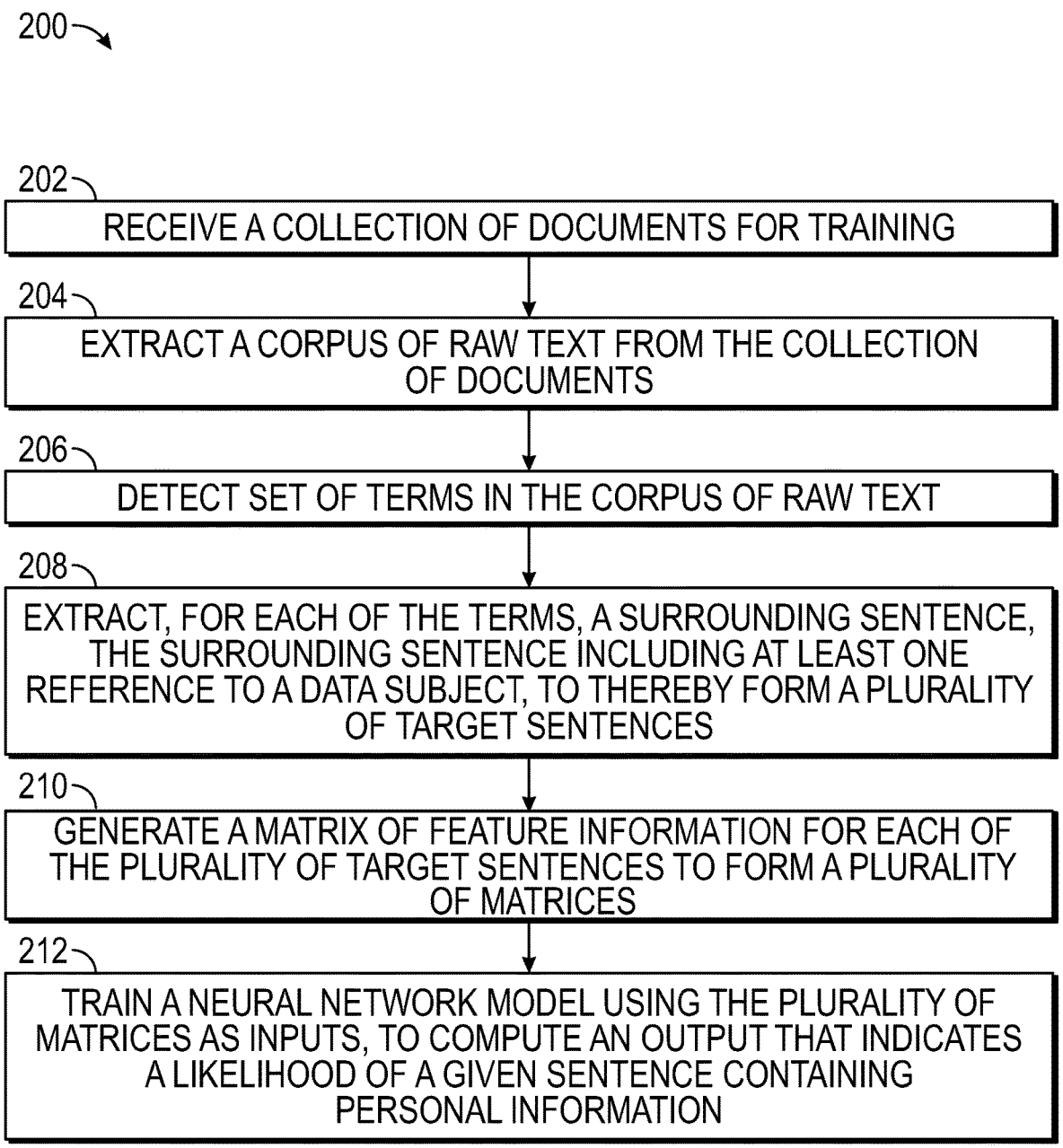
FIG. 2 is a flowchart illustrating a process for training a neural network model to detect personal information in accordance with one or more example embodiments.

FIG. 2 is a flowchart illustrating a process 200 for training a neural network model to detect personal information in accordance with one or more example embodiments. The process 200 in FIG. 2 may be implemented using the detection system 101 of FIG. 1.

The process 200 begins by receiving a collection of documents for training (operation 202). The collection of documents may include structure documents, structured documents, tables, databases, word processing documents, images, PDFs, or a combination thereof. The collection is a collection of electronic documents (e.g., digital files).

A corpus of raw text is extracted from the collection of documents (operation 204). In one or more examples, any identifiable raw text is extracted from each document (e.g., digital file).

A set of terms in the corpus of raw text is detected (operation 206). In operation 206, this set of terms includes those terms that match to a term compilation, such as the term compilation 120 described with respect to FIG. 1. In other words, the set of terms is a term of interest. As discussed above, a "term" may be a word or a phrase that has been previously identified as being related to personal information or a category of personal information. As previously described, the term compilation may be a dictionary of terms, a database of terms, a list of terms, or some other compilation of terms that have been previously identified as being related to personal information or a category of personal information. In some examples, the detection in operation 206 includes direct, as well as indirect, matching. In some cases, the detection is based on identifying a term as exactly matching a known word or phrase in the term compilation or as being part of a family of word forms for the known word or phrase in the term compilation. For example, the word "Democratic" may be considered sufficiently matched to "Democrat" in the term compilation to be flagged as a "term" that is of interest in operation 206.

For each of the terms detected in operation 206, a surrounding sentence is extracted, the surrounding including at least one reference to a data subject, to thereby form a plurality of target sentences (operation 208). Operation 208 may be performed by, for example, the sentence extractor 112 described with respect to FIG. 1. Operation 208 may be performed by first identifying a sentence that contains a particular term of interest. Depending on the rules set in place for the sentence extractor 112, this sentence may be required to be a complete sentence or may be a sentence fragment. If the sentence contains a reference to a data subject, that sentence is extracted to form a target sentence. The reference may be, for example, a name of a person (e.g., a first name, a last name, both), a pronoun, a direct reference to a person or type of person, or some other type of reference identifying a data subject that is potentially the data subject for which the sentence may include personal information. In one or more examples, the reference or references to a data subject in a sentence may be identified using, for example, a set of known pronouns, a set of known references to persons, a natural language processing system capable of identifying names of persons, a dictionary of references, or a combination thereof.

A matrix of feature information is generated for each of the plurality of target sentences to form a plurality of matrices (operation 210). In operation 210, the matrix generated for a given target sentence encodes information about features generated for each token (e.g., word or special character) in the target sentence. An example of one manner in which operation 210 may be performed is described below in FIG. 3.

Thereafter, a neural network model is trained, using the plurality of matrices as inputs, to compute an output that indicates a likelihood of a given sentence containing personal information (operation 212). In operation 212, the neural network model may be, for example, the neural network model 105 described with respect to FIG. 1. The neural network model may include a recurrent neural network. In one or more examples, the neural network is trained to output a probability indicator having a value between 0 and 1 that indicates the likelihood of a given sentence containing personal information. An example of one manner in which operation 212 may be performed is described below in FIG. 4.

In one or more examples, every document that includes at least some threshold number of sentences that have been identified as containing personal information may be flagged as "personal" or "sensitive." This threshold number of sentences may be, for example, one sentence, two sentences, three sentences, or some other number of sentences.

Figure 3:
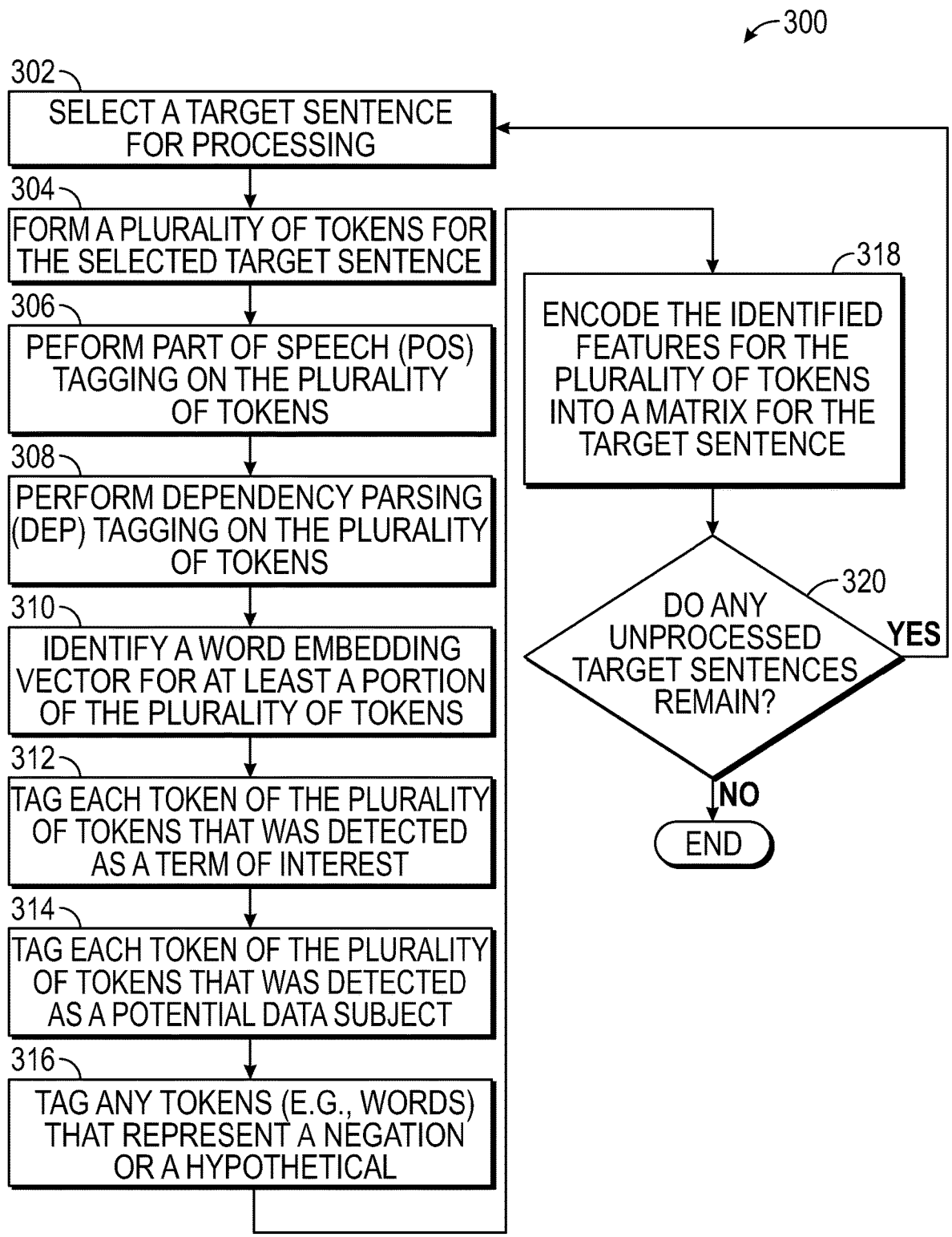
FIG. 3 is a flowchart illustrating a process for training a neural network model to detect personal information in accordance with one or more example embodiments.

FIG. 3 is a flowchart illustrating a process 300 for training a neural network model to detect personal information in accordance with one or more example embodiments. The process 300 in FIG. 3 may be implemented using the detection system 101 of FIG. 1. In particular, the process 300 may be implemented using the feature manager 114 of the detection system 101 in FIG. 1. The process 300 in FIG. 3 is an example of one manner in which operation 210 in FIG. 2 may be performed.

The process 300 begins by selecting a target sentence from the plurality of target sentences for processing (operation 302).

A plurality of tokens is formed for the selected target sentence (operation 304). In one or more examples, the plurality of tokens includes each word and special character in that target sentence. In other examples, the plurality of tokens includes each word and one or more special characters of interest in that target sentence. For example, not all special characters may be treated as tokens. Special characters may include, but are not limited to: ".", ",", "?", "!", "#", "&", "%", "*", etc.

Thereafter, part of speech (POS) tagging is performed on the plurality of tokens (operation 306). POS tagging includes identifying the POS for each applicable token of the plurality of tokens. In one or more examples, this POS tagging is performed using a natural language processing system that integrated as part of or in communication with the detection system 101 in FIG. 1. POS tagging may not be applicable to tokens that are special characters. Accordingly, POS tagging may not identify a POS for every token of the plurality of tokens. In one or more examples, the POS tag is a numerical vector representation of the POS.

Next, dependency parsing (DEP) tagging is performed on the plurality of tokens (operation 308). DEP tagging includes identifying the grammatical structure and/or relationship of a given word (or token) with respect to other words in a sentence. For example, a word that is a both a noun and a subject of a sentence may be tagged as "nsubj." A root verb of a sentence may be tagged as "root." Further, words that are prepositions, indicate possession, are modifiers (e.g., adjectives, adverbs, etc.), are also tagged as such. In this manner, DEP tagging of a plurality of tokens for a target sentence may identify the relationships between "head" words in that target sentence and words, which modify those "heads." DEP tagging may not result in a tag for every token. For example, DEP tagging may not be applicable to one or more different types of special characters. In one or more examples, the DEP tag may be a numerical vector representation of the grammatical structure and/or relationship of a given word (or token) with respect to other words in a sentence.

A word embedding vector is identified for at least a portion of the plurality of tokens (operation 310). The word embedding vector may be multi-dimensional, having any number of dimensions (e.g., about 50 dimensions). The word embedding vector identified for a token captures the "meaning" or "context" of that token. In one or more examples, the word embedding vector may be obtained using a learning algorithm initialized with the Global Vectors (GloVe) pretrained by the Stanford Natural Language Processing (NLP) group.

Each token of the plurality of tokens that was detected as a term of interest is tagged (operation 312). For example, a one-dimensional vector for term of interest may be assigned a "1" if the token was detected as the term of interest of a "0" otherwise. This one-dimensional vector may also be referred to as a "flag." Further, each token of the plurality of tokens that was detected as referencing a potential data subject is tagged (operation 314). For example, a one-dimensional for data subject may be assigned a "1" if the token was detected as referencing a potential data subject or a "0" otherwise.

Any tokens (e.g., words) that represent a negation or a hypothetical are tagged (operation 316). For example, a one-dimensional for negation-hypothetical may be assigned a "1" if the token was detected as representing a negation or hypothetical or a "0" otherwise. In some cases, no tokens are tagged in operation 316. Examples of words that represent negation include, for example, but are not limited to: "not," "never," "unless," or some other word indicating the negative circumstance or situation. Examples of words that represent a hypothetical include, for example, but are not limited to: "if," "should," "whether," or some other word indicating a hypothetical circumstance or situation. The tag (or value) itself may be referred to as a negation-hypothetical tag.

The identified features for the plurality of tokens are encoded into a matrix for the target sentence (operation 318). The matrix may include, for each token, a numerical representation of the various features identified above. In these examples, a matrix may be comprised of rows and columns that form a sequence of vectors. In other examples, a matrix may be the abstract construct for a sequence of vectors corresponding to a respective sequence of tokens identified from the target sentence. Each vector may include a set of feature vectors. A feature vector encodes information for a token with respect to a particular feature. The feature vector may be one-dimensional or multi-dimensional. In one or more examples, each vector includes: a POS vector, a DEP vector, a word embedding vector, a term of interest vector, a data subject vector, and a negation-hypothetical vector. In other examples, each vector may include one or more additional or alternative vectors, flags, or both.

A determination is then made as to whether any unprocessed target sentences remain (operation 320). If no unprocessed target sentences remain, the process 300 terminates. Otherwise, the process 300 returns to operation 302 as described above. In this manner, operations 304-318 are performed for every target sentence in the plurality of target sentences, such as the plurality of target sentences identified in operation 208 in FIG. 2.

Figure 4:
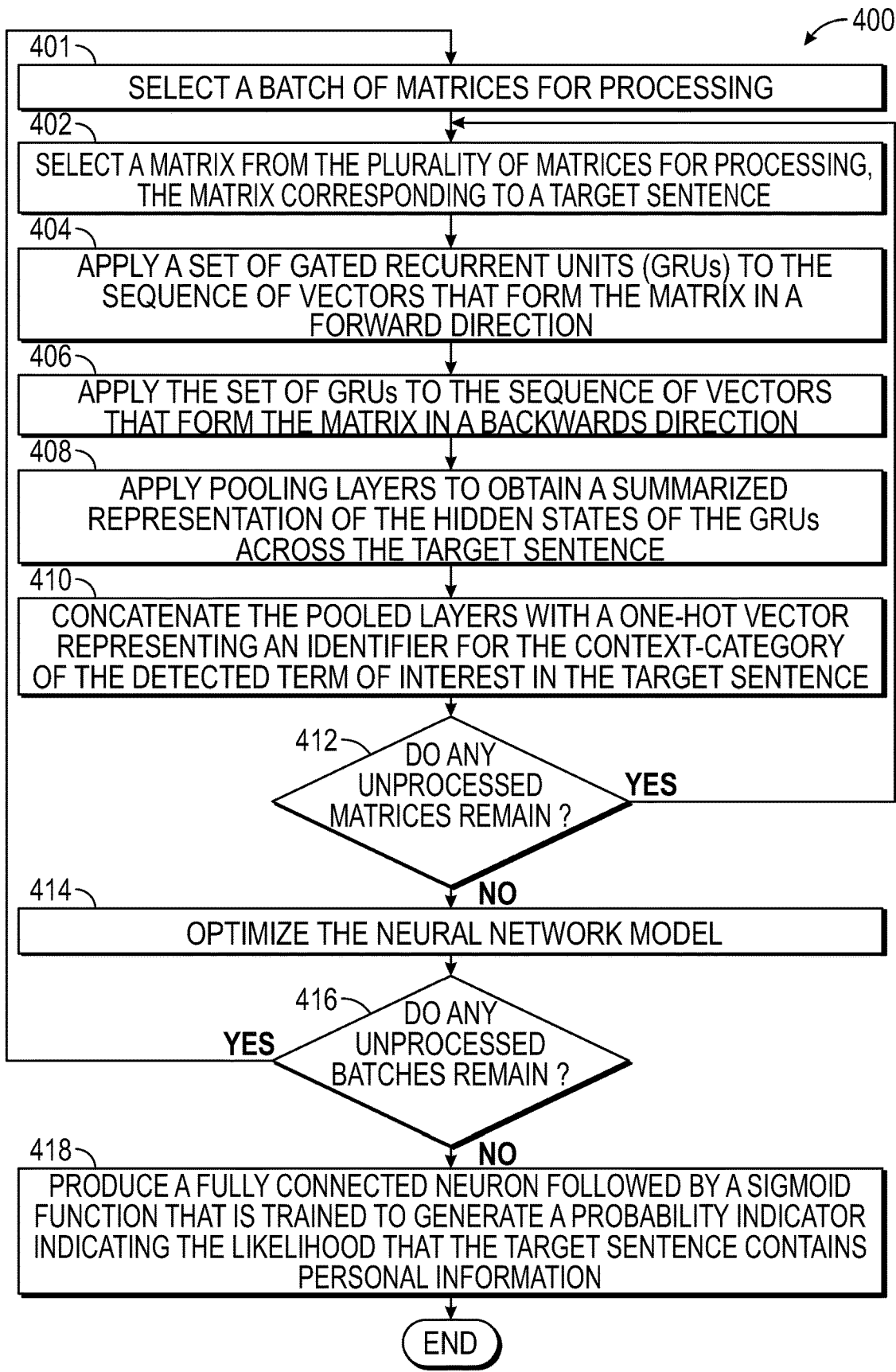
FIG. 4 is a flowchart illustrating a process for training a neural network model in accordance with one or more example embodiments.

FIG. 4 is a flowchart illustrating a process 400 for training a neural network model in accordance with one or more example embodiments. The process 400 in FIG. 4 may be implemented using the detection system 101 of FIG. 1. Further, this process 400 may be an example a process used to implemented operation 210 in FIG. 2.

The process 400 begins by selecting a batch of matrices for processing (operation 401). A batch of matrices may be a portion of the matrices generated via the process 300 described in FIG. 3 above. For example, the process 300 in FIG. 3 may produce 1000 matrices for 1000 sentences. These 1000 matrices may be apportioned into batches of 10, 25, 50, 100, or some other number. A matrix from the batch is selected for processing, the matrix corresponding to a target sentence (operation 402).

A first set of gated recurrent units (GRUs) is applied to the sequence of vectors that form the matrix in a forward direction (operation 404). A second set of GRUs is applied to the sequence of vectors that form the matrix in a backwards direction (operation 406). In this manner, the target sentence is essentially analyzed in a forwards and backwards direction to obtain context for each word within the borders of the sentence.

With respect to operations 404 and 406, a GRU, for each timestamp t of a given sequence $x=(x_1, x_2, \ldots x_n)$, updates its hidden states $h=(h_1, h_2, \ldots h_n)$ as follows:

(1) Update gate to determine how much of the past information needs to be passed along to future timestamps:

$$z_t = \sigma(W^{(z)}x_t + U^{(z)}h_{t-1}) \quad (1)$$

(2) Reset gate to regulate how much of the past information the model should forget:

$$r_t = \sigma(W^{(r)}x_t + U^{(r)}h_{t-1}) \quad (2)$$

(3) Current memory content:

$$h'_t = \tanh(W \cdot x_t + r_t \odot (U \cdot h_{t-1})) \quad (3)$$

(4) Current hidden state:

$$h_t = z_t \odot h_{t-1} + (1-z_t) \odot h'_t \quad (4)$$

Where $\odot$ is an element-wise product;

$\sigma$ is a sigmoid function: $\sigma(x)=1/(1+e^{31\,x})$, and $\quad (5)$ tanh is the hyperbolic tangent function: $\tanh(x) = (e^{2x}-1)/(e^{2x}+1)$. $\quad (6)$ The sequence x may be the sequence of vectors.

Thereafter, pooling layers are applied to obtain a summarized representation of the hidden states of the GRUs across the target sentence (operation 408). These pooling layers may include, for example, max pooling and average pooling. In some examples, regularization techniques are used to reduce overfitting. For example, dropout and batch-normalization may be used in between dense pooling layers during training to reduce overfitting.

The pooled layers are concatenated with a one-hot vector representing an identifier for the context-category of the detected term of interest in the target sentence (operation 410). This identifier may be, for example, a context-category number (religious, political, etc.)

A determination is made as to whether any unprocessed matrices remain (operation 412). If any unprocessed matrices remain, the process 400 returns to operation 402 as described above. Otherwise, optimization of the neural network model is performed (operation 414). This optimization may include, for example, backpropagation, loss function minimization, etc. A determination is made as to whether any unprocessed batches remain (operation 416). If any unprocessed batches remain, the process 400 proceeds to operation 401 as described above. Otherwise, the neural network produces a fully connected neuron followed by a sigmoid function that is trained to generate a probability indicator indicating the likelihood that the target sentence contains personal information (operation 418). This probability indicator may have a value between about 0 and 1.

The process 400 described in FIG. 4 may be iteratively repeated to optimize the neural network model. For example, for each iteration of the process 400, a different apportioning of batches may be utilized. In some cases, operation 414 may be performed as part of or after operation 418 such that the optimization is performed after an entire iteration of batches has been processed.

Figure 5:
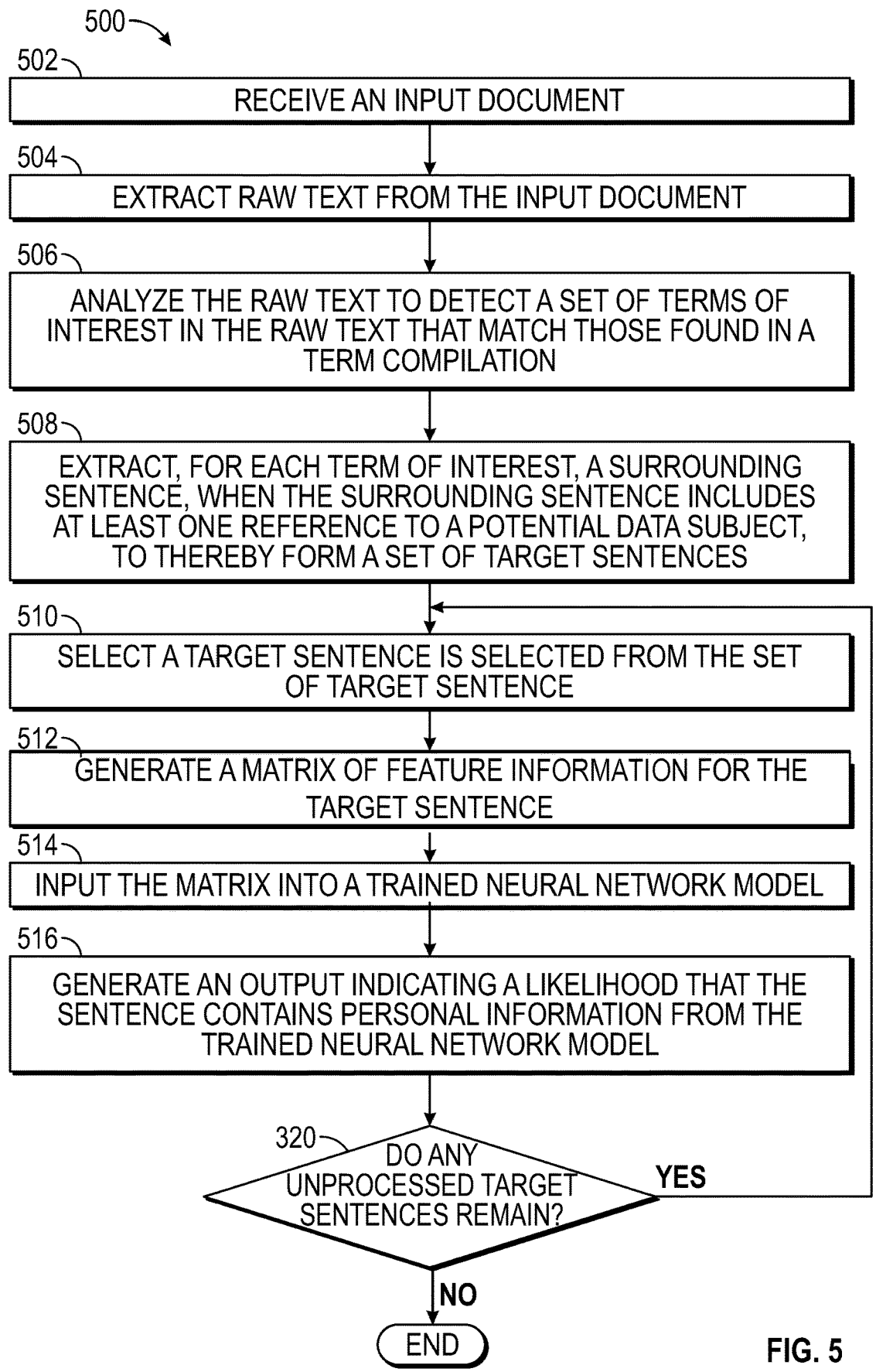
FIG. 5 is a flowchart illustrating a process for using a trained neural network model to detect personal information in accordance with one or more example embodiments.

FIG. 5 is a flowchart illustrating a process 500 for using a trained neural network model to detect personal information in accordance with one or more example embodiments. The process 500 in FIG. 5 may be implemented using the detection system 101 of FIG. 1. Further, this process 500 may be implemented using the neural network model 105 described with respect to FIG. 1 and/or the neural network model trained via the process 200 in FIG. 2 and/or via the process 400 in FIG. 4.

The process 500 begins by receiving an input document (operation 502). The document may be a document received from an entity such as, for example, a business organization, a nonprofit organization, a hospital, an educational institution, a legal firm, a financial institution, or some other type of entity.

Raw text is extracted from the input document (operation 504). The raw text is analyzed to detect a set of terms of interest in the raw text that match those found in a term compilation (operation 506). This term compilation may be, for example, a dictionary of terms that have been identified as being related to personal information.

For each term of interest, a surrounding sentence is extracted, when the surrounding sentence includes at least one reference to a potential data subject, to thereby form a set of target sentences (operation 508). Operation 508 may be performed by first identifying a sentence that contains a particular term of interest. This sentence may be a complete sentence or a sentence fragment. If the sentence contains a reference to a potential data subject, that sentence is extracted to form a target sentence. The reference may be, for example, a name of a person (e.g., a first name, a last name, both), a pronoun, a direct reference to a person or type of person, or some other type of reference. In one or more examples, the reference or references to a potential data subject in a sentence may be identified using, for example, a set of known pronouns, a set of known references to persons, a natural language processing system capable of identifying names of persons, a dictionary of references, or a combination thereof.

Thereafter, a target sentence is selected from the set of target sentences (operation 510). A matrix of feature information is generated for the target sentence (operation 512). Operation 512 may be performed in a manner similar to the process 300 described with respect to FIG. 3.

The matrix is input into a trained neural network model (operation 514). An output indicating a likelihood that the sentence contains personal information is generated from the trained neural network model (operation 516). In one or more examples, this output may be used to classify the sentence as either a "personal sentence" or a "nonpersonal sentence." For example, the output may be a value between 0 and 1, with a value closer to 1 indicating a greater likelihood that the target sentence contains personal data. In some cases, the threshold for classification may be set to a value between about 0.5 and about 0.99. In one example, the threshold is set to 0.75 such that any sentence associated with an output value of 0.75 or greater is classified as a "personal sentence" (e.g., a sentence containing personal information). In other examples, the threshold is set to 0.5, 0.6, 0.7, 0.8, or 0.9.

A determination is made as to whether any unprocessed target sentences remain (operation 518). If no unprocessed target sentences remain, the process 500 terminates. Otherwise, the process 500 returns to operation 510 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
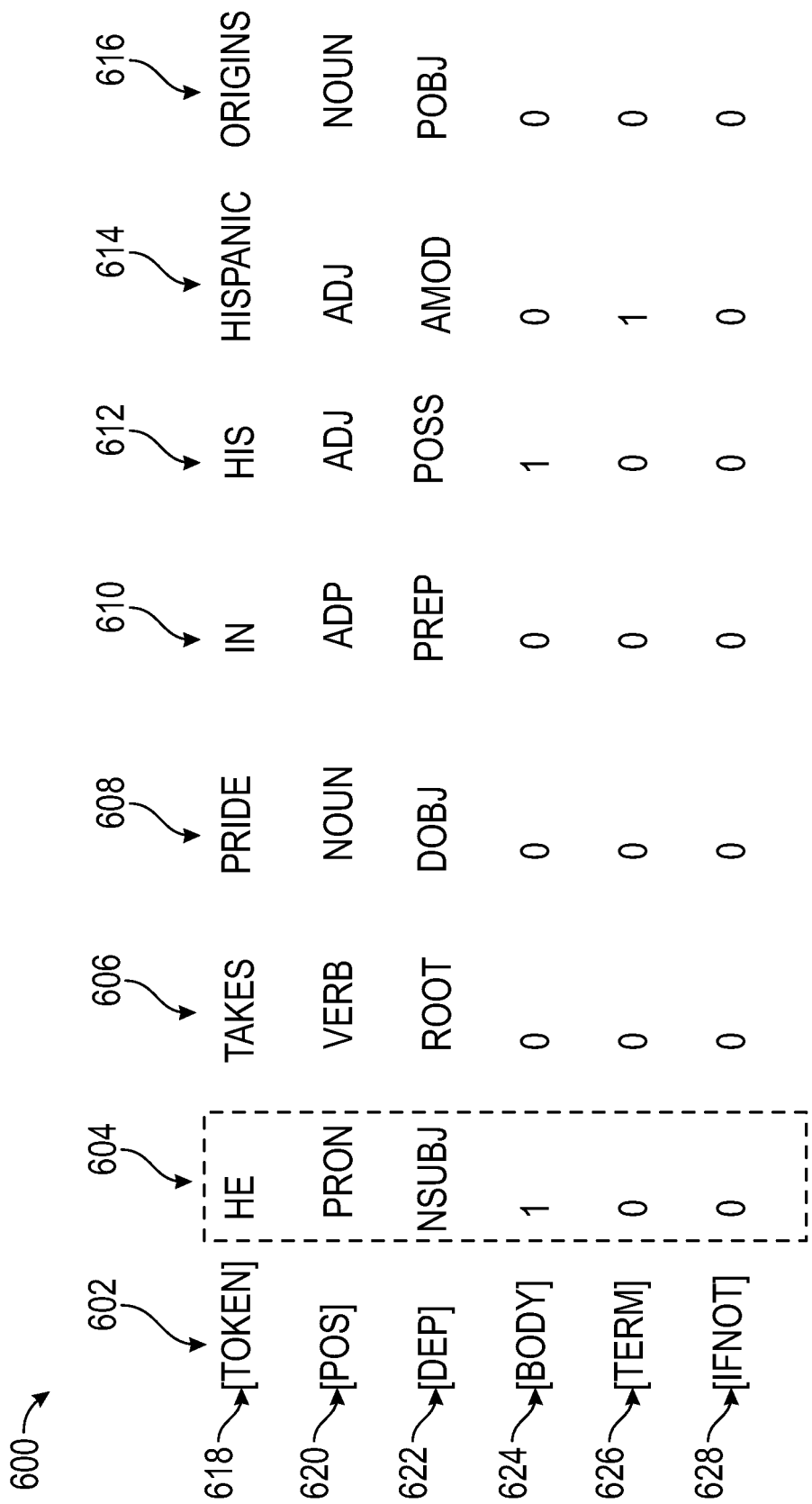
FIG. 6 is a matrix of feature information in accordance with one or more embodiments.

FIG. 6 is a matrix of feature information in accordance with one or more embodiments. Matrix 600 is an example of one type of representation for one of the matrices 124 described with respect to FIG. 1. As depicted, matrix 600 includes a sequence of vectors 602. Vectors 602 include vector 604, vector 606, vector 608, vector 610, vector 612, vector 614, and vector 616. Each of the vectors 602 includes values (or tags) that represent a corresponding token in an abstract manner. In particular, each of the vectors 602 includes values (or tags) for different features generated for the token corresponding to that vector.

For example, vector 604 includes a value for each of token 618, POS 620, dependency 622, potential data subject 624, term of interest 626, and negation-hypothetical 628. The value for token 618 identifies the particular portion (or token) of the target sentence being represented. This token 618 may identify, for example, a word or a special character. When put together in sequence, the value for token 618 for each of the vectors 602 forms the target sentence.

The value for POS 620 identifies the part of speech associated with the token. Although the value for POS 620 is shown as an abbreviation for the part of speech, the value for POS 620 may be a vector representation of a part of speech. The value for dependency 622 identifies the grammatical structure and/or relationship of the token to other tokens (e.g., words) in the target sentence. Although the value for dependency 622 is shown as an abbreviation, the value for POS 620 may be a vector representation of the grammatical structure of a token and/or the relationship of the token to other tokens. The value for potential data subject 624 indicates whether the particular token was identified as a reference to a potential data subject. The value for term of interest 626 indicates whether the particular token was identified as a term of interest. The value for negation-hypothetical 628 indicates whether the token signals a negative or hypothetical in the target sentence.

Figure 7:
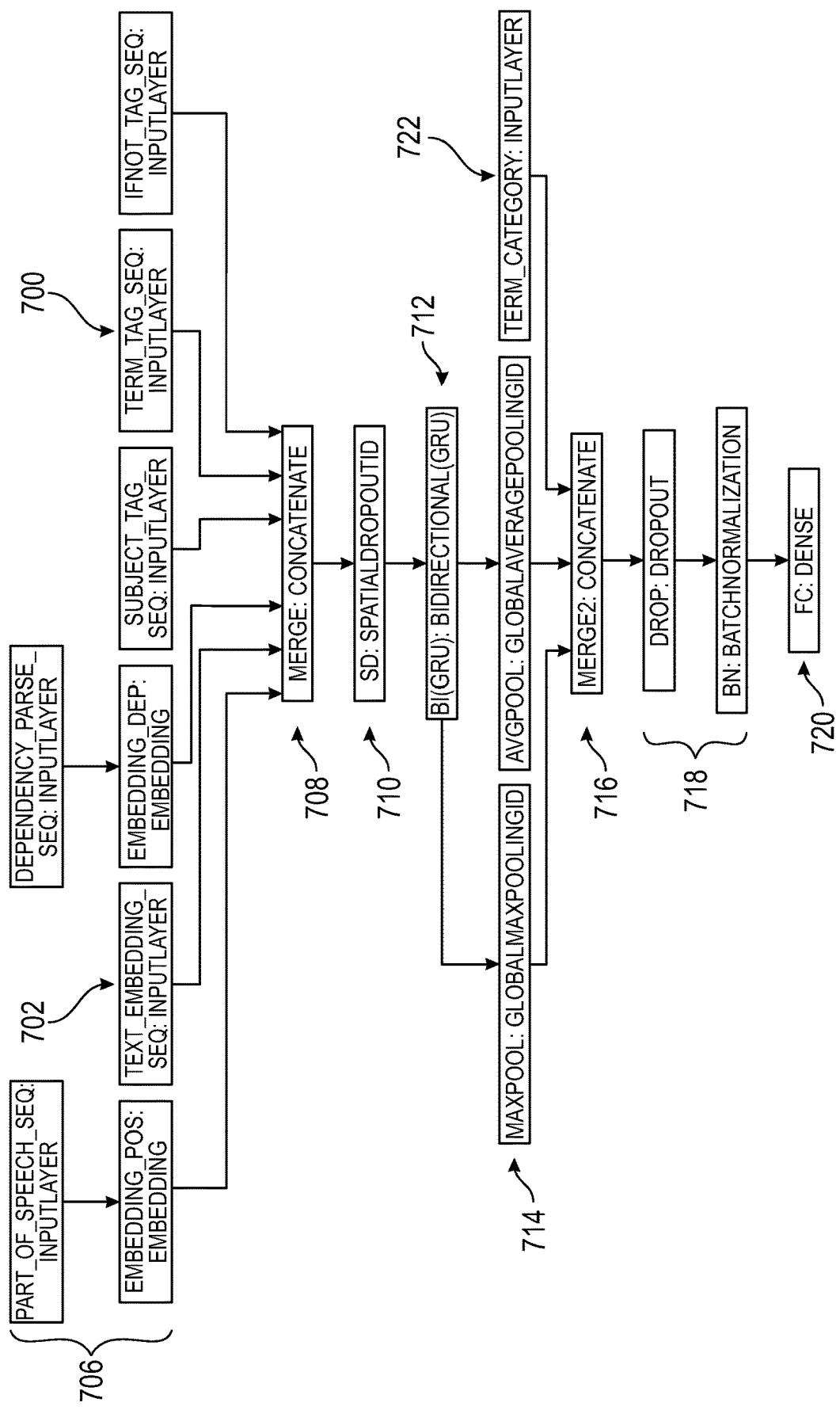
FIG. 7 is an example of an architecture for a neural network model in accordance with one or more embodiments.

FIG. 7 is an example of an architecture 700 for a neural network model 702 in accordance with one or more embodiments. Architecture 700 illustrates the various layers involved in the training of the neural network model 702. The neural network model 702 is an example of one manner in which the neural network model 105 described above with respect to FIG. 1 may be implemented. Further, the neural network model 702 is an example of the neural network model described with respect to FIGS. 2-5.

The neural network model 702 includes a plurality of layers 704. A layer may include one or more layers of processing. The layers 704 include an input layer 706, a first concatenation layer 708, a regularization layer 710, a bidirectional context layer 712, a pooling layer 714, a second concatenation layer 716, a normalization layer 718, and an output layer 720. Each of these various layers may include one or more layers.

For a given target sentence, the input layer 706 receives, as input, various feature information that has been generated for the target sentence. In one or more examples, these inputs are received as vectors. For example, a matrix that includes a sequence of vectors may be input into the neural network model 702, each vector representing a different token and including a set of feature vectors. Each set of feature vectors is considered an input in the input layer 706. For a multidimensional feature vector, the input layer 706 includes embedding (or encoding) that is used to encode the feature vector into a dense representation of that feature vector. A dense representation of a vector may be one that contains only or mostly non-zero elements. In one or more examples, the input layer 706 performs this embedding (or encoding) for the POS vector and the DEP vector.

The inputs in the input layer 706 are processed via the first concatenation layer 708 to form a sequence of one-hot vectors. The regularization layer 710 includes performing regularization (e.g. spatial dropout) on the sequence of on-hot vectors to reduce overfitting. The bidirectional context layer 712 includes applying a first set of GRUs to the sequence of one-hot vectors in a forward direction and a second set of GRUs to the sequence of one-hot vectors in a backward direction. Thereafter, the pooling layer 714 involves using pooling techniques (e.g., Global Max pooling, Global Average pooling) to obtain a summarized representation of the hidden states of the GRUs across the target sentence. The outputs of the pooling layer 714 may be concatenated with a term category vector 722 via the second concatenation layer 716 to form a new sequence of vectors. The normalization layer 718 includes further normalization (e.g., batch normalization, spatial dropout, etc.) of the new sequence of vectors. The normalized vector is sent into the output layer 720 to produce a fully connected neuron with a sigmoid activation function that outputs a probability indicator having a value between 0 and 1. This neural network model 702 may use this value to learn.

Figure 8:
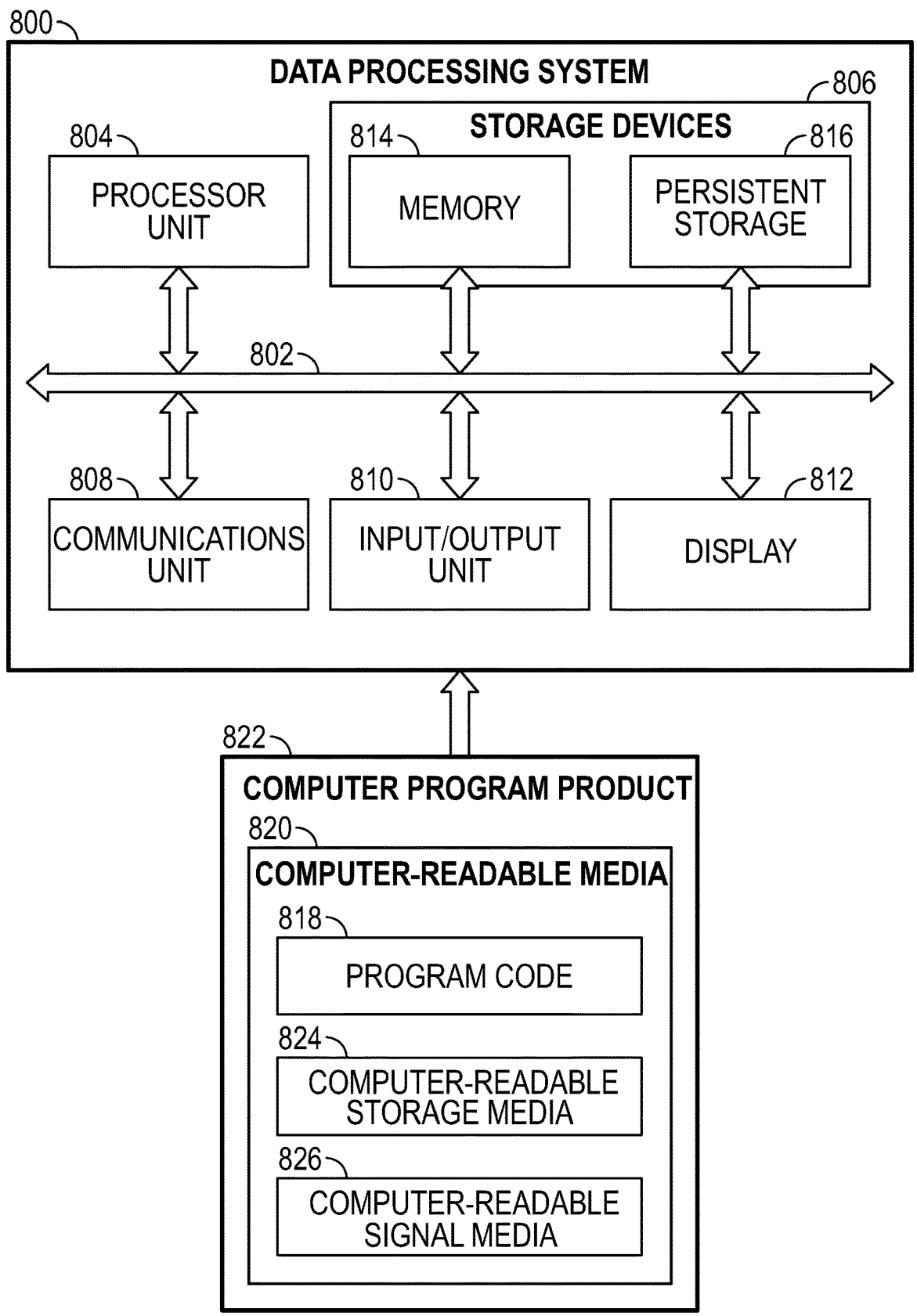
FIG. 8 is a block diagram of a data processing system in accordance with one or more embodiments.

FIG. 8 is a block diagram of a data processing system in accordance with one or more embodiments. Data processing system 800 may be used to implement computer system 102 in FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer-readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a solid state drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer-usable program code, or computer-readable program code and may be read and executed by one or more processors in processor unit 804.

In these examples, program code 818 is located in a functional form on computer-readable media 820, which is selectively removable, and may be loaded onto or transferred to data processing system 800 for execution by processor unit 804. Program code 818 and computer-readable media 820 together form computer program product 822. In this illustrative example, computer-readable media 820 may be non-transitory (e.g., computer-readable storage media 824) or transitory (e.g., computer-readable signal media 826).

Computer-readable storage media 824 is a physical or tangible storage device used to store program code 818 rather than a medium that propagates or transmits program code 818. Computer-readable storage media 824 may be, for example, without limitation, an optical or magnetic disk or a persistent storage device that is connected to data processing system 800.

Alternatively, program code 818 may be transferred to data processing system 800 using computer-readable signal media 826. Computer-readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The present embodiments can take the form of an entirely hardware embodiment, an entirely software embodiment, or an embodiment containing both hardware and software elements. Accordingly, it is understood that any operation of the computing systems of the computer system 102 in FIG. 1 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    detecting, by a processor, terms in a corpus of raw text extracted from a collection of documents;
    extracting, by the processor, for each of the terms, a surrounding sentence, based at least in part on determining that the surrounding sentence includes a reference to a data subject, to thereby form a group of target sentences;
    generating, by the processor, a matrix of feature information for each target sentence of the group of target sentences to form a plurality of matrices; and
    training, by the processor, a neural network model to compute an output that indicates a likelihood of a given sentence containing personal information using the plurality of matrices as inputs, wherein the training comprises:
        applying a first set of gated recurrent units and a second set of gated recurrent units of the neural network model to a sequence of vectors in the matrix of feature information for a first target sentence of the group of target sentences in a forward direction and a backward direction, respectively;
        obtaining a summarized representation of states of the first set of gated recurrent units and of the second set of gated recurrent units across the first target sentence according to a plurality of pooling layers; and
        concatenating the plurality of pooling layers with a vector representing an identifier for a context category of a detected term of interest in the first target sentence.

2. The method of claim 1, further comprising
    determining, by the processor, in response to the output indicating that the given sentence contains the personal information, that a document that contains the given sentence is a sensitive document.

3. The method of claim 1, wherein the extracting comprises:
extracting, by the processor, a sentence that contains a first term as the surrounding sentence in response to the sentence including at least one item selected from a list consisting of: a name of the data subject, a pronoun referencing the data subject, and a direct reference to a person.

4. The method of claim 1, wherein the generating comprises:
generating, by the processor, a plurality of features for each of a plurality of tokens formed for the first target sentence of the group of target sentences, wherein the plurality of features includes at least one item selected from a list consisting of: a part of speech tag, a dependency parsing tag, a word embedding vector, a data subject tag, and a negation-hypothetical tag.

5. The method of claim 1, wherein the generating comprises:
forming, by the processor, a plurality of tokens for the first target sentence of the group of target sentences, wherein a token of the plurality of tokens is either a word or a special character in the first target sentence.

6. The method of claim 1, further comprising: computing, by the neural network model after training, the output that indicates the likelihood that the given sentence contains personal information.

7. The method of claim 1, wherein the neural network model is a sequence-based recurrent neural network model.

8. A non-transitory machine-readable medium having stored thereon instructions for performing a method of detecting personal information, the non-transitory machine-readable medium comprising machine-executable code which, when executed by at least one machine, causes the at least one machine to:
extract raw text from a collection of documents to form a corpus of raw text;
detect terms in the corpus of raw text;
extract, for each of the terms, a surrounding sentence, based at least in part on determining that the surrounding sentence includes a reference to a data subject, to thereby form a group of target sentences;
generate a matrix of feature information for each target sentence of the group of target sentences to form a plurality of matrices, wherein the matrix of feature information for a first target sentence of the group of target sentence includes a sequence of vectors for a plurality of tokens identified from the first target sentence; and
train a neural network model to compute an output that indicates a likelihood of a given sentence containing personal information using the plurality of matrices as inputs, wherein the machine-executable code to cause the at least one machine to train the neural network model comprises machine-executable code that causes the at least one machine to:
apply a first set of gated recurrent units and a second set of gated recurrent units of the neural network model to the sequence of vectors in the matrix of feature information for the first target sentence of the group of target sentences in a forward direction and a backward direction, respectively;
obtain a summarized representation of states of the first set of gated recurrent units and of the second set of gated recurrent units across the first target sentence according to a plurality of pooling layers; and
concatenate the plurality of pooling layers with a vector representing an identifier for a context category of a detected term of interest in the first target sentence.

9. The non-transitory machine-readable medium of claim 8, wherein the machine-executable code further causes the at least one machine to:
determine, in response to the output indicating that the given sentence contains the personal information, that a document that contains the given sentence is a sensitive document.

10. The non-transitory machine-readable medium of claim 8, wherein the machine-executable code further causes the at least one machine, as part of the extracting, for each of the terms, to:
extract a sentence that contains a first term as the surrounding sentence in response to the sentence including at least one item selected from a list consisting of: a name of the data subject, a pronoun referencing the data subject, and a direct reference to a person.

11. The non-transitory machine-readable medium of claim 8, wherein the machine-executable code further causes the at least one machine, as part of the generating, to:
generate a plurality of features for each of the plurality of tokens formed for the first target sentence of the group of target sentences, wherein the plurality of features includes at least one item selected from a list consisting of: a part of speech tag, a dependency parsing tag, a word embedding vector, a data subject tag, or a negation-hypothetical tag.

12. The non-transitory machine-readable medium of claim 8, wherein the machine-executable code further causes the at least one machine, as part of the training, to:
transform the sequence of vectors in the matrix of feature information for the first target sentence of the group of target sentences into a sigmoid function using a plurality of layers, the plurality of layers including the first set of gated recurrent units and the second set of gated recurrent units.

13. The non-transitory machine-readable medium of claim 8, wherein the neural network model comprises a sequence-based recurrent neural network model.

14. The non-transitory machine-readable medium of claim 8, wherein the machine-executable code further causes the at least one machine to:
compute, via the neural network model after training, the output that indicates the likelihood that the given sentence contains personal information.

15. A computing device comprising:
a memory containing machine-readable medium comprising machine-executable code having stored thereon instructions for detecting personal information; and
a processor coupled to the memory, the processor configured to execute the machine-executable code to cause the processor to:
detect a term that is of interest in a corpus of raw text;
extract a surrounding sentence that includes the term and at least one reference to a potential data subject as a target sentence, wherein the surrounding sentence is extracted based at least in part on determining that the surrounding sentence includes the at least one reference to the potential data subject;
form a plurality of tokens from the target sentence;
generate a matrix of feature information for the target sentence, the matrix of feature information including a sequence of vectors for the plurality of tokens;
train a neural network model to compute an output that indicates a likelihood of a given sentence containing personal information using the matrix of feature information as input, wherein the machine-executable code to cause the processor to train the neural network model comprises machine-executable code to cause the processor to:
apply a first set of gated recurrent units and a second set of gated recurrent units of the neural network model to the sequence of vectors in the matrix of feature information for the target sentence in a forward direction and a backward direction, respectively;
obtain a summarized representation of states of the first set of gated recurrent units and of the second set of gated recurrent units across the target sentence according to a plurality of pooling layers; and
concatenate the plurality of pooling layers with a vector representing an identifier for a context category of a detected term of interest in the target sentence; and compute, via the neural network model after training, the output that indicates the likelihood that the given sentence contains personal information.

16. The computing device of claim 15, wherein the neural network model comprises a sequence-based recurrent neural network model.

17. The computing device of claim 15, wherein a first vector in the sequence of vectors for a corresponding token of the plurality of tokens includes a part of speech tag.

18. The computing device of claim 15, wherein a first vector in the sequence of vectors for a corresponding token of the plurality of tokens includes a dependency parsing tag.

19. The computing device of claim 15, wherein a first vector in the sequence of vectors for a corresponding token of the plurality of tokens includes a word embedding vector.

20. The computing device of claim 15, wherein the output is a probability indicator having a value between 0 and 1.

* * * * *